(12) United States Patent
Brown, Jr.

(10) Patent No.: US 6,317,613 B1
(45) Date of Patent: Nov. 13, 2001

(54) AUDIO IN A MOBILE RECEIVER

(75) Inventor: James F. Brown, Jr., Apex, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 08/986,329

(22) Filed: Dec. 8, 1997

(51) Int. Cl.$^7$ ................................................ H04B 7/015
(52) U.S. Cl. ........................ 455/570; 455/72; 370/202; 381/57
(58) Field of Search .................... 455/570, 569, 455/278.1, 501, 506, 63, 67.1, 67.3, 79, 81, 84, 72, 296, 106; 379/410, 406, 3; 381/57, 94.1; 333/14; 370/202

(56) References Cited

U.S. PATENT DOCUMENTS

| | | | |
|---|---|---|---|
| 3,808,540 | * | 4/1974 | Kabrick .............................. 325/187 |
| 4,061,874 | * | 12/1977 | Fricke et al. ........................ 381/106 |
| 4,061,875 | * | 12/1977 | Freifeld et al. ..................... 381/106 |
| 4,381,488 | * | 4/1983 | Fricke et al. ......................... 333/14 |
| 5,535,433 | * | 7/1996 | Kurokawa et al. .................... 455/79 |
| 5,734,987 | * | 3/1998 | Shiono et al. ....................... 455/570 |
| 5,751,822 | * | 5/1998 | Yamaguchi et al. ................ 381/94.1 |
| 5,812,944 | * | 9/1998 | Matsumoto .......................... 455/403 |
| 5,903,853 | * | 5/1999 | Sano .................................... 455/570 |

* cited by examiner

Primary Examiner—Lee Nguyen
(74) Attorney, Agent, or Firm—Jenkens & Gilchrist

(57) ABSTRACT

A system and method are disclosed whereby, in order to achieve a desired receive audio dynamic range compression factor (e.g., 2:1) at higher background noise levels, an analog mobile station's receiver is inhibited from expanding the received compressed signal. In other words, the received audio signal remains compressed for local background noise levels above a predetermined threshold level. Also, a digital mobile station's audio receiver (or mobile station's receiver that uses digital signal processing for audio) is enabled to achieve a 2:1 compression directly on an uncompressed receive audio signal using a compression software algorithm. In other words, the received (uncompressed) audio signal is compressed in the digital receiver for local background noise levels above a predetermined threshold level, in order to achieve a desired dynamic range.

11 Claims, 4 Drawing Sheets

AUDIO IN A MOBILE RECEIVER

BACKGROUND OF THE INVENTION

1. Technical Field of the Invention

The present invention relates in general to the mobile communications field and, in particular, to a method and system for improving voice signals in a mobile station receiver.

2. Description of Related Art

In a cellular telephone communications link, voice signals are compressed in order to improve the intelligibility of the signals being received in the presence of high local background noise. In conventional analog cellular communications systems, such as the Advanced Mobile Phone System (AMPS), compression is used for speech transmissions over the radio link. In conventional digital cellular communications systems, such as the Digital-AMPS (D-AMPS), compression is not used for speech transmissions over the radio link.

For example, FIG. 1 is a simplified block diagram that illustrates speech compression in a conventional analog cellular communications system. For example, the system shown in FIG. 1 can represent a base transceiver station (BTS) and mobile station in the AMPS. As shown, on the transmitter side 10 of the BTS, a 2:1 compressor 12 (referred to as a compander in AMPS) produces a 1 dB increase at its output for each 2 dB increase of the speech signal at its input. As such, speech companding on the transmitter side limits the frequency deviation of the transmitted carrier, constrains the energy to a finite channel bandwidth, and creates a quieting effect during a speech burst. On the receiver side 20 of the mobile station, an expander 26 decompresses the received signal and the input speech signal is restored with a minimum of distortion.

A significant problem addressed by the present invention is related to the use of speech compression in communications systems, and the intelligibility of received speech signals in noisy environments. For example, cellular radio mobile stations are commonly operated in relatively high ambient noise level environments. Typical operating environments can include the interior of a moving automobile or a congested sidewalk along a busy thoroughfare. The ambient noise levels experienced in such environments easily range from 60 to 80 dB SPL (sound pressure level referenced to $20e^{-6}$ Pascals). Such noise levels can mask the desired speech content in the transmitted signals. As such, telephone usability studies disclose that people consider ambient noise levels of 60 dB SPL and higher to cause a substantial amount of speech interference. For the same people, ambient noise levels of 80 dB SPL and higher made telephone usage impossible. By compressing the dynamic range of speech signals in a mobile station's receiver, all useful speech information can be maintained above a much higher noise floor without exceeding maximum usable limits.

Typically, as noise levels increase, the volume of the received speech signals can be increased to maintain the signal intelligence above the noise interference level. With the high ambient noise levels frequently encountered in the operating environments of mobile stations, the conventional solution has been to increase the average or nominal receive speech levels of the mobile stations accordingly. However, there are significant limitations with this approach. For example, distortion due to limiting is introduced into the receive signals at levels of about 120 dB SPL. This non-linearity sounds quite unpleasant to a user, and it also diminishes the effectiveness of certain signal processing techniques that utilize linear signals, such as, for example, echo cancellation. Additionally, there is a 95 dB SPL hearing overload limit across the frequency spectrum. This overload limit is the sound level above which (at each frequency) a listener's hearing will no longer respond to any increase.

In a specific frequency band, a speech signal has a 30 dB dynamic range within the full intelligible speech range. In this 30 dB dynamic range, the signal peaks are about 12 dB above the average level with information to 18 dB below the average level. Considering the frequency content of speech, the dynamic range of speech with full intelligibility is about 45 dB. The problem with increasing the receive volume as the ambient noise levels are increased is that a point can be reached where the speech intelligibility is diminished due to losses in the dynamic range at the upper end. Assuming (for simplicity) that the frequency content of speech and noise is flat, the ability to maintain maximum intelligibility begins to decrease at an ambient noise level of about 65 dB SPL. As such, a 95 dB SPL overload point minus the 30 dB speech dynamic range equals the resulting speech noise interference floor of 65 dB SPL.

Speech content in a signal that is useful for intelligibility purposes is the speech information maintained between the noise floor and the overload point. The amount of useful speech information can be approximated by using the arithmetic average of the speech energy in the three octave bands of 600–1200, 1200–2400, and 2400–4800 Hz. The speech articulation index is a percentage of the useful speech content with respect to the total possible speech information that is of importance for intelligibility. The speech articulation index can be approximated by dividing the useful speech content (dB) by 30 dB, and multiplying by 100. If the ambient noise level is low enough to allow all speech information to be below the 95 dB SPL overload point, the articulation index is 100%. However, if (because of a high ambient noise level) the useful speech content is contained in a 15 dB range, the articulation index is 15 dB/30 dB*100, which is 50%. For proper intelligibility of a speech signal, the articulation index should be at least 30% and preferably above 60%. Using the speech frequency spectrum for an average male user (see FIG. 2), these percentages correspond to approximately 86 dB SPL and 75 dB SPL noise levels, respectively. At a 65 dB SPL noise level, which is just about where speech interference has been reported to begin, the best expected articulation index is approximately 84%.

Sound engineers have long confronted the problem of limited dynamic range for speech. The broadcasting, sound reinforcement, and recording environments all have limited usable dynamic ranges when compared to the source content. A great deal of sound information would be lost if this limited dynamic range problem were to be left unresolved. The conventional solution of sound engineers to this problem is to compress the audio signal. This compression allows the resulting wide dynamic range signal to fit within the more limited dynamic range of the transmission or storage medium being used.

SUMMARY OF THE INVENTION

Conventional analog cellular mobile stations typically use 2:1 audio compression factors for broadcast bandwidth reasons. The base station's transmitter compresses the audio signal, and the mobile station's receiver expands the received audio signal in order to restore the dynamic range. However, in accordance with the preferred embodiment of the present invention, in order to achieve a desired receive audio dynamic range compression factor (e.g., 2:1) at higher background noise levels), the analog mobile station's receiver is inhibited from expanding the demodulated compressed signal. In other words, the received audio signal remains compressed for local background noise levels above a predetermined threshold level. In accordance with a second embodiment of the present invention, a digital mobile station's audio receiver (or mobile station's receiver that uses digital signal processing for audio) is enabled to achieve a 2:1 compression directly on the uncompressed receive audio signal using a compression software algorithm. In other words, the received (uncompressed) audio signal is compressed in the digital receiver for local background noise levels above a predetermined threshold level to achieve a desired dynamic range.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Figure 1:
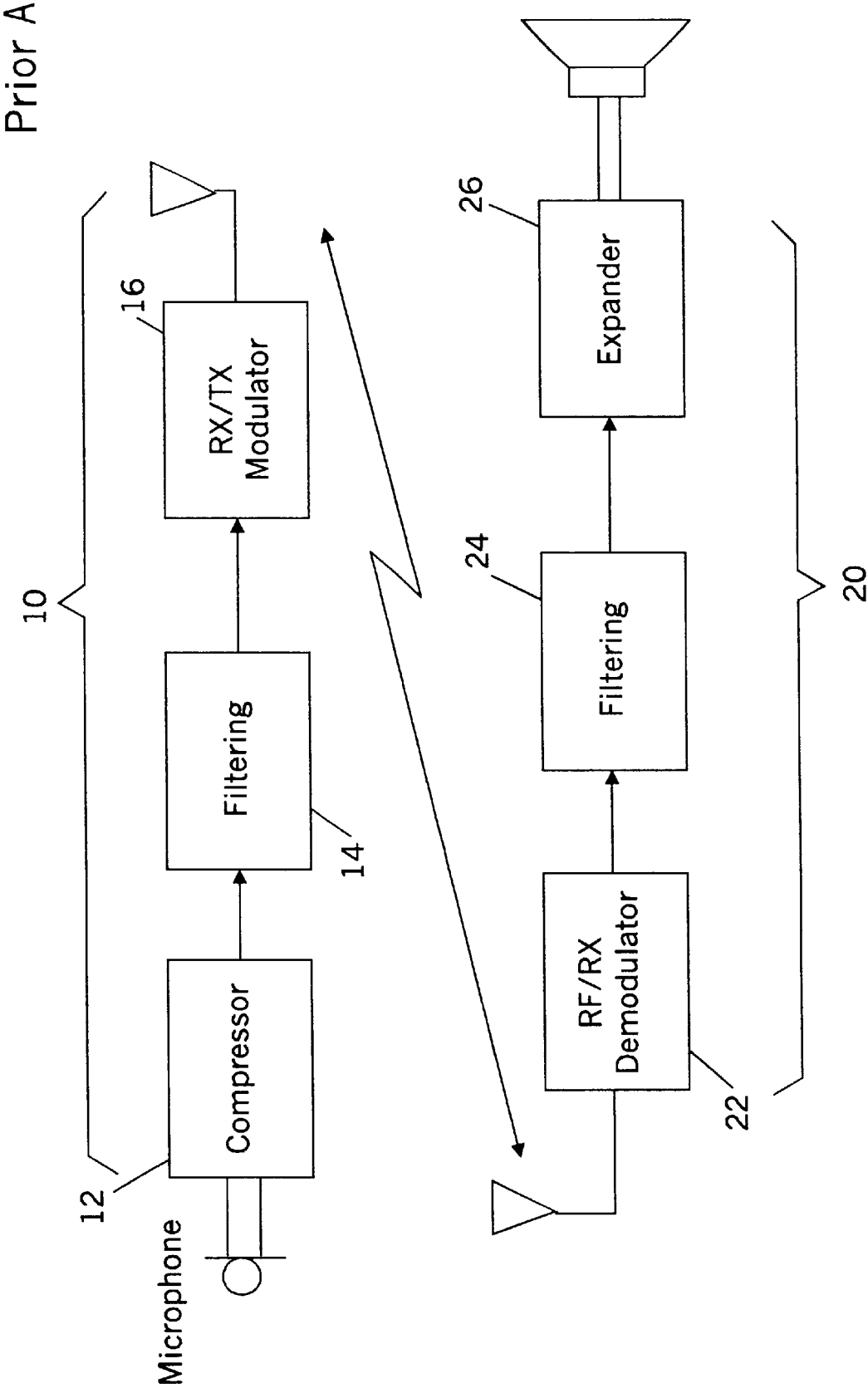
FIG. 1 is a simplified block diagram that illustrates speech compression in a conventional analog cellular communications system.
Figure 2:
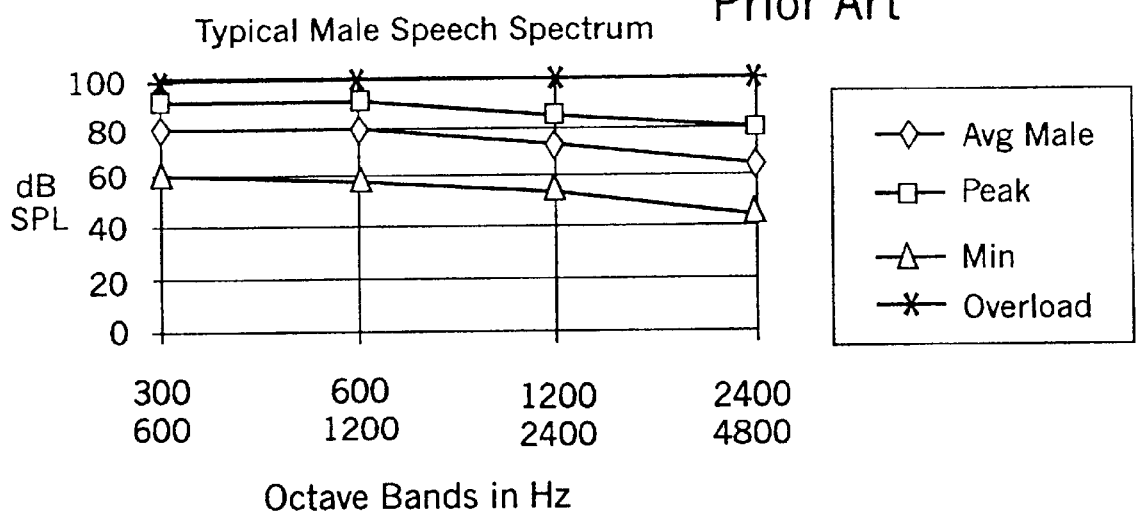
FIG. 2 is a diagram that illustrates the speech frequency spectrum for an average male user of a cellular radiotelephone.
Figure 3:
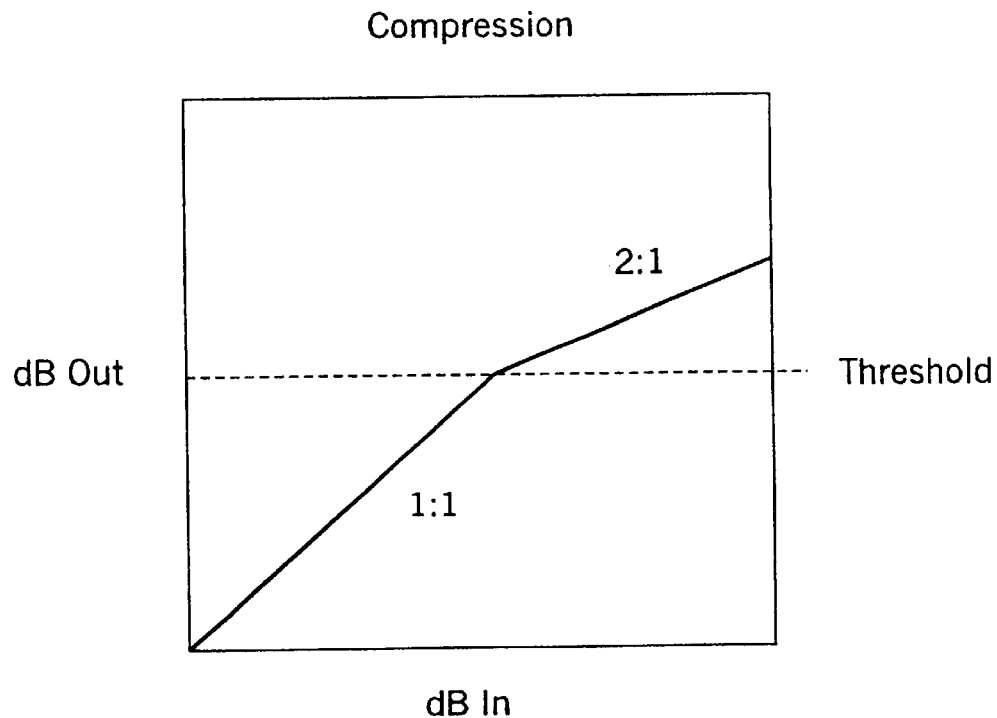
FIG. 3 is a diagram that illustrates the input signal response for a compression amplifier.

Essentially, a compressor is an amplifier whose gain varies as a function of the input signal. At input signal levels below a predetermined threshold, the amplifier has unity gain. In other words, as illustrated by FIG. 3, a 2 dB increase in the signal level at the amplifier's input will result in a 2 dB change at the output. However, when the input signal level exceeds the predetermined threshold, the amplifier's gain decreases. For example, for a 2:1 compression factor (compressor operating above the threshold), a 2 dB increase of the signal at the input would result in a 1 dB increase of the signal at the output.

Speech compression can be accomplished electronically in the analog domain by using input signal detection circuitry that varies a control voltage to a voltage controlled amplifier. In the digital domain, speech compression can be accomplished using software techniques. A typical approach used to perform real-time digital compression makes use of a digital signal processor (DSP).

Conventional analog cellular mobile stations typically use 2:1 audio compression factors for broadcast bandwidth reasons. The base station's transmitter compresses the audio signal, and the mobile station's receiver expands the received audio signal in order to restore the dynamic range. Notably, in accordance with the present invention, in order to achieve the desired receive audio dynamic range compression factor (e.g., 2:1 at higher background noise levels) described earlier, the analog mobile station's receiver does not expand the demodulated compressed signal. In other words, the received audio signal remains compressed for local background noise levels above a predetermined threshold level. Also in accordance with the present invention, a digital mobile station's audio receiver (or mobile station's receiver that uses digital signal processing for audio) can achieve a 2:1 compression directly on the uncompressed receive audio using an existing compression software algorithm. In other words, the received (uncompressed) audio signal is compressed in the digital receiver for local background noise levels above a predetermined threshold level. Consequently, if a speech articulation index is calculated for a 2:1 compressed receive audio signal, the divisor will be 15 dB rather than 30 dB. The 15 dB value is used, because (with the appropriate detection threshold) the dynamic range of fully intelligible speech is contained within a 15 dB dynamic range rather than the 30 dB dynamic range of uncompressed speech. Therefore, using 15 dB for the above-described example that determined the maximum noise floor while maintaining an articulation index of 100%, the noise floor could increase by 15 dB to 80 dB SPL (i.e., 95 dB SPL minus 15 dB equals 80 dB SPL). Considering the average male's speech frequency spectrum (FIG. 2), it is possible to achieve an articulation index of 60% with 85 dB SPL of ambient noise. In contrast, without compression, the earlier calculations resulted in a best articulation index of approximately 60% with an ambient noise level of 75 dB. Comparing the compressed and uncompressed results, by implementing a 2:1 compression of the receive audio signal, a desirable articulation index can be achieved at a 10 dB SPL higher ambient noise level than with the conventional uncompressed receive signal. Additionally, this higher articulation index can be achieved while maintaining linearity in the received signal, which allows the use of linear signal-dependent signal processing techniques. Moreover, by producing more intelligible information at the higher ambient noise levels, all of these benefits can be realized while also increasing the safety and comfort levels for the mobile stations' users.

Figure 4:
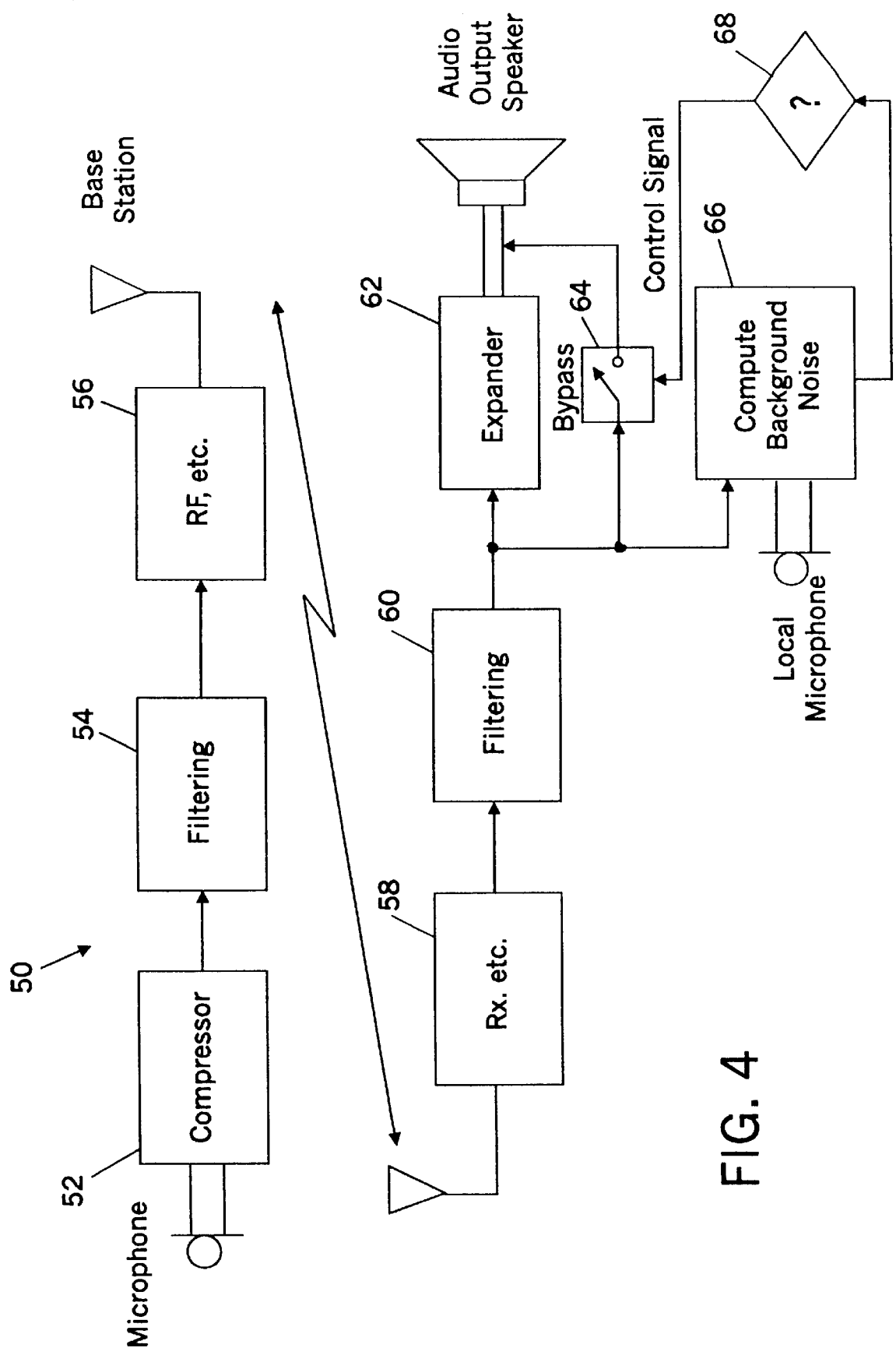
FIG. 4 is a simplified block diagram of an exemplary analog cellular communications system, which is structured to function in accordance with a preferred embodiment of the present invention.

Specifically, FIG. 4 is a simplified block diagram of an exemplary analog cellular communications system 50, which is structured to function in accordance with a preferred embodiment of the present invention. System 50 includes a transmit subsystem and a receive subsystem. For this exemplary embodiment, system 50 can be an AMPS. Preferably, the transmit subsystem forms part of a base station transmitter. The transmit subsystem includes a compressor 52, which compresses the input audio signal from a microphone or similar analog audio or speech signal input device. For an AMPS base station transmitter, the compression ratio used is preferably 2:1. The compressed speech signal from compressor 52 is passed through a highpass filter 54 and otherwise processed. For example, the compressed speech signal can be passed through a deviation limiter (to limit the maximum frequency deviation at the receiver to an appropriate frequency range). The resulting signal can then be passed through a lowpass filter to ensure that emissions outside the appropriate frequency band are suppressed. The compressed speech signal is then upconverted to a radio frequency (RF) signal in RF output section 56 and transmitted over the air interface.

The receive subsystem preferably forms part of an AMPS mobile station receiver and includes a receive front end section 58, which functions to demodulate the received (compressed) speech signal. The demodulated speech signal is passed through a filter 60 (essentially functioning as the reverse of the highpass filtering, deviation limiting, and lowpass filtering functions used in the transmit subsystem). At this point, in accordance with the present invention, the local background noise level is evaluated, and the compressed, filtered speech signal from filter section 60 is either expanded or maintained compressed depending on the level of the local background noise.

Specifically, a processor 66 in the mobile station senses an audio signal input from a local microphone (e.g., the mobile station's microphone), and calculates the average local background noise level using a conventional algorithm. The processor 66 determines (68) whether the calculated average local background noise level is greater than or equal to a predetermined (threshold) background noise level. If not (the background noise level is lower than the predetermined threshold level), then the compressed speech signal from the filter 60 is coupled to an expander 62 and expanded to obtain a 1:1 compression ratio (uncompressed signal. The expanded (restored) speech signal is then output to an audio output section and speaker.

However, on the other hand, if the local background noise level is greater than or equal to the predetermined threshold level, then the processor 66 outputs a control signal to a bypass switch 64, which enables switch 64 to route the compressed speech signal around the expander 62 and thereby maintain the original compression ratio (e.g., 2:1). The compressed speech signal is coupled to the audio output section and speaker. In other words, for appreciable local background noise levels (above the selected threshold), the receiving expander (62) is disabled, and the compression ratio of the compressed speech signal is maintained in the analog mobile station's receiver in order to obtain the desired dynamic range.

Figure 5:
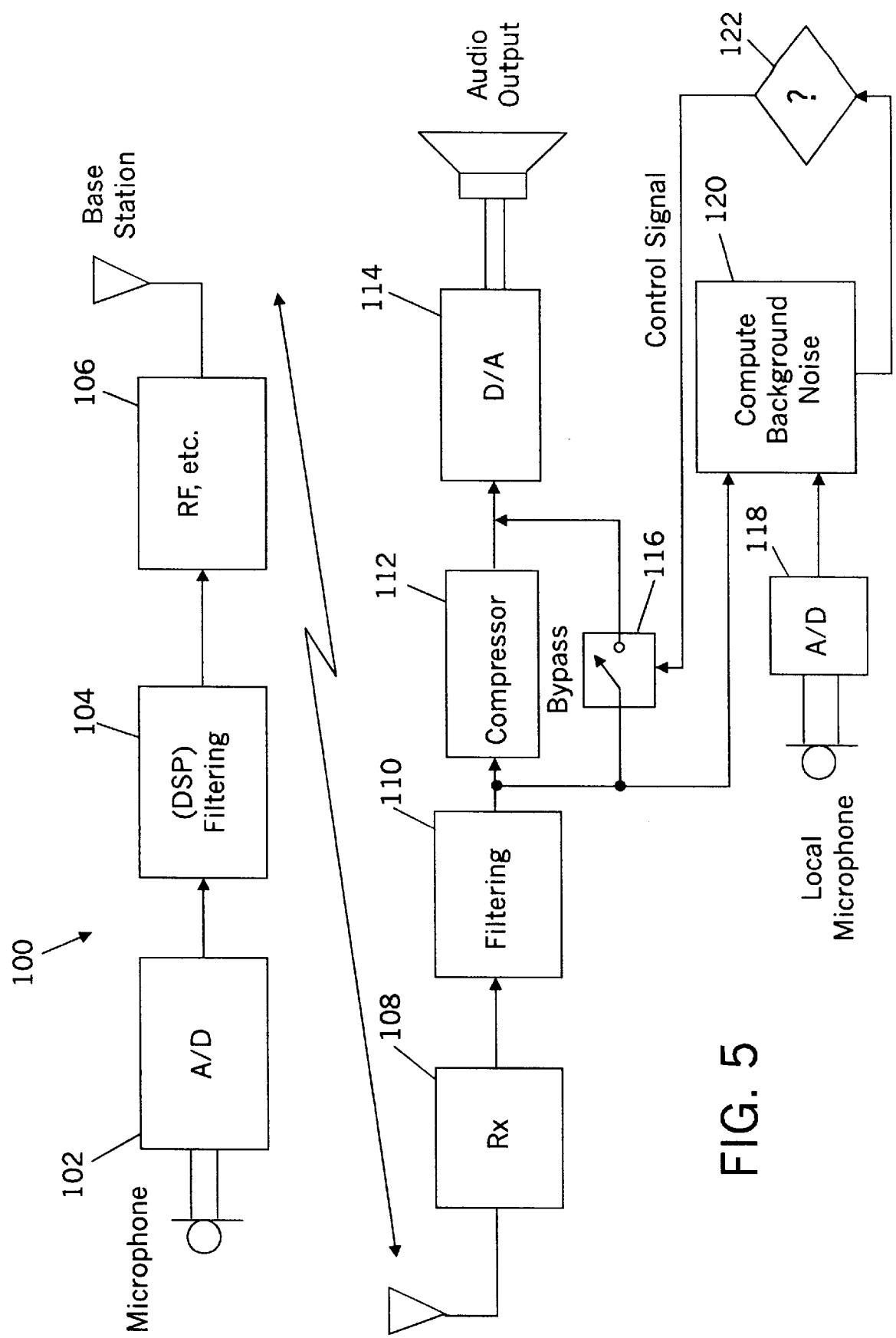
FIG. 5 is a simplified block diagram of an exemplary digital cellular communications system, which is structured to function in accordance with a second embodiment of the present invention.

FIG. 5 is a simplified block diagram of an exemplary digital cellular communications system 100, which is structured to function in accordance with a second embodiment of the present invention. System 100 includes a transmit subsystem and a receive subsystem. For this exemplary embodiment, system 100 can be a D-AMPS or ETACS. Preferably, the transmit subsystem forms part of a base station transmitter. The transmit subsystem includes an analog to digital (A/D) converter 102, which functions to convert the input analog speech signal from a microphone to a digital signal. For a digital base station transmitter, the speech signal to be transmitted is not compressed. The (uncompressed) speech signal from the A/D converter 102 is passed through a filter section 104, which is typically a digital signal processor (DSP) that is used to filter digital audio signals. The filtered digital speech signal (uncompressed) is then upconverted to an RF signal in RF output section 106 and transmitted over the air interface.

The receive subsystem preferably forms part of a D-AMPS (ETACS, etc.) digital mobile station receiver and includes a receive front end section 108, which functions to detect the received digital speech signal. The detected speech signal is passed through a filter section 110 (typically a DSP used as a digital filter). At this point, in accordance with the present invention, the local background noise level is evaluated, and the (uncompressed) filtered speech signal from filter section 110 is either compressed or maintained uncompressed depending on the level of the local background noise.

Specifically, a processor 120 in the mobile station senses an audio signal input from a local microphone (e.g., the mobile station's microphone), which has been converted to a digital signal by an A/D converter 118. The processor 120 calculates the average local background noise level using a conventional algorithm. The processor 120 determines (122) whether the calculated average local background noise level is less than or equal to a predetermined (threshold) background noise level. If not (the background noise level is greater than the predetermined threshold level), then the uncompressed speech signal from the filter section 110 is coupled to a compressor 112 and compressed to obtain a desired compression ratio (e.g., 2:1 for D-AMPS). The compressed speech signal is then converted to an analog signal by digital to analog (D/A) converter 114, and output to an audio output section and speaker.

However, on the other hand, if the local background noise level is less than or equal to the predetermined threshold level (122), then the processor 120 outputs a control signal to a bypass switch 116, which enables switch 116 to route the uncompressed speech signal around the compressor 112 and thereby maintain the original speech signal in its uncompressed form. The uncompressed speech signal is converted to an analog signal (114) and coupled to the audio output section and speaker. In other words, for appreciable local background noise levels (above the selected threshold), the receiving compressor (112) is enabled, and the speech signal is compressed in the digital mobile station's receiver in order to obtain the desired dynamic range.

In general, for relatively high local background noise levels, the receive audio signal can be compressed in both the analog and digital mobile stations' receivers, in order to obtain the desired dynamic ranges. As such, in a specific application of the invention, compression can be automatically enabled for an analog or digital mobile station receiver in typically high background noise level environments. For example, processor 66 (analog receiver in FIG. 4) can output a control signal to bypass switch 64 so that the receive compression factor is maintained (expander 62 bypassed) when the mobile station (e.g., a cellular telephone) is inserted into a hands-free cradle. For that same scenario, processor 120 (digital receiver in FIG. 5) could inhibit sending a control signal to bypass switch 116 so that compressor 112 would be enabled. Also, as another example, the respective processors (64, 120) can automatically enable compression for the received audio if the analog or digital mobile station is being used in conjunction with a hearing aid.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An improved audio receiver, comprising:

decompression circuitry for decompressing a received audio signal;

detection circuitry for detecting a background noise level at the audio receiver within the received audio signal; and a switch for bypassing said decompression circuitry, said switch causing the received audio signal to bypass said decompression circuitry when said detected background noise level is greater than or equal to a predetermined noise level.

2. The improved audio receiver of claim 1, wherein said receiver comprises an analog mobile station receiver.

3. The improved audio receiver of claim 2, wherein said analog mobile station receiver comprises an AMPS mobile telephone audio receiver.

4. The improved audio receiver of claim 1, wherein said decompression circuitry decompresses the received audio signal to a 1:1 compression ratio.

5. The improved audio receiver of claim 1, wherein said circuitry for determining a background noise level comprises:
- a microphone for detecting a local signal; and
- a processor for calculating the background noise level from the local signal and controlling the switch in response thereto.

6. The improved audio receiver of claim 1, wherein said switch assumes said detected background noise level is greater than or equal to said predetermined noise level when said receiver is used in conjunction with a hands-free cradle.

7. The improved audio receiver of claim 1, wherein said switch assumes said detected background noise level is greater than or equal to said predetermined noise level when said receiver is used in conjunction with a hearing aid.

8. A method for improving performance of an audio receiver, comprising the steps of:

- receiving an audio signal;
- determining a background noise level at the audio receiver within the received audio signal;
- decompressing the received audio signal if the determined background noise level within the received audio signal is less than a predetermined threshold level; and
- bypassing the step of decompressing the received audio signal if said determined background noise level within the received audio signal is greater than or equal to the predetermined noise level.

9. The method of claim 8, wherein said audio receiver comprises an analog mobile station audio receiver.

10. The method of claim 8, wherein the step of bypassing further comprises the step of actuating a switch between a first and second positions responsive to the determined background noise level within the received audio signal.

11. The method of claim 8, wherein the step of bypassing further comprises the step of actuating a switch between a first and second positions responsive to the determined background noise level within the received audio signal.

* * * * *